United States Patent [19]

Holmberg, Jr. et al.

[11] Patent Number: 5,129,448
[45] Date of Patent: Jul. 14, 1992

[54] LOW TORQUE HINGED HEAT TRANSFER JOINT

[75] Inventors: Arthur Holmberg, Jr., Cypress; David E. Wilson, Huntington Beach, both of Calif.

[73] Assignee: Rockwell International Corporation, El Segundo, Calif.

[21] Appl. No.: 414,502

[22] Filed: Sep. 29, 1989

[51] Int. Cl.$^5$ .............................................. F28F 5/00
[52] U.S. Cl. ..................................... 165/86; 165/185; 16/385
[58] Field of Search ............... 165/86, 185; 16/273, 16/385; 244/75 R, 117 A, 213, 131; 384/907.1

[56] References Cited

U.S. PATENT DOCUMENTS

| 502,706 | 8/1893 | Corscaden et al. | 16/273 |
| 504,877 | 9/1893 | Hart | 16/273 |
| 1,738,015 | 12/1929 | Parsons | 16/385 X |
| 2,051,428 | 8/1936 | Tatlow | 16/273 |
| 3,844,341 | 10/1974 | Bimshas, Jr. et al. | 165/86 |
| 4,345,798 | 8/1982 | Cortès | 384/125 |
| 4,468,138 | 8/1984 | Nagel | 384/303 |

FOREIGN PATENT DOCUMENTS 289757 5/1928 United Kingdom ................. 16/273

*Primary Examiner*—Martin P. Schwadron
*Assistant Examiner*—Allen J. Flanigan
*Attorney, Agent, or Firm*—H. Fredrick Hamann; George A. Montanye; David J. Arthur

[57] ABSTRACT

A heat transfer hinge: a first rotor; a second rotor; a pivot means for pivotally coupling the first rotor to the second rotor, each rotor being free to pivot on a pivot axis passing between the first and second rotor; a means for thermally coupling a thermally conductive flat surface to the first rotor, the flat surface being positioned to be normal to the pivot axis; a means for thermally coupling a thermally conductive flat surface to the second rotor, the flat surface being positioned to be normal to the pivot axis; and, a means for holding the first rotor flat surface against the second rotor flat surface as the first rotor is pivoted on the pivot axis with respect to the second rotor.

14 Claims, 6 Drawing Sheets

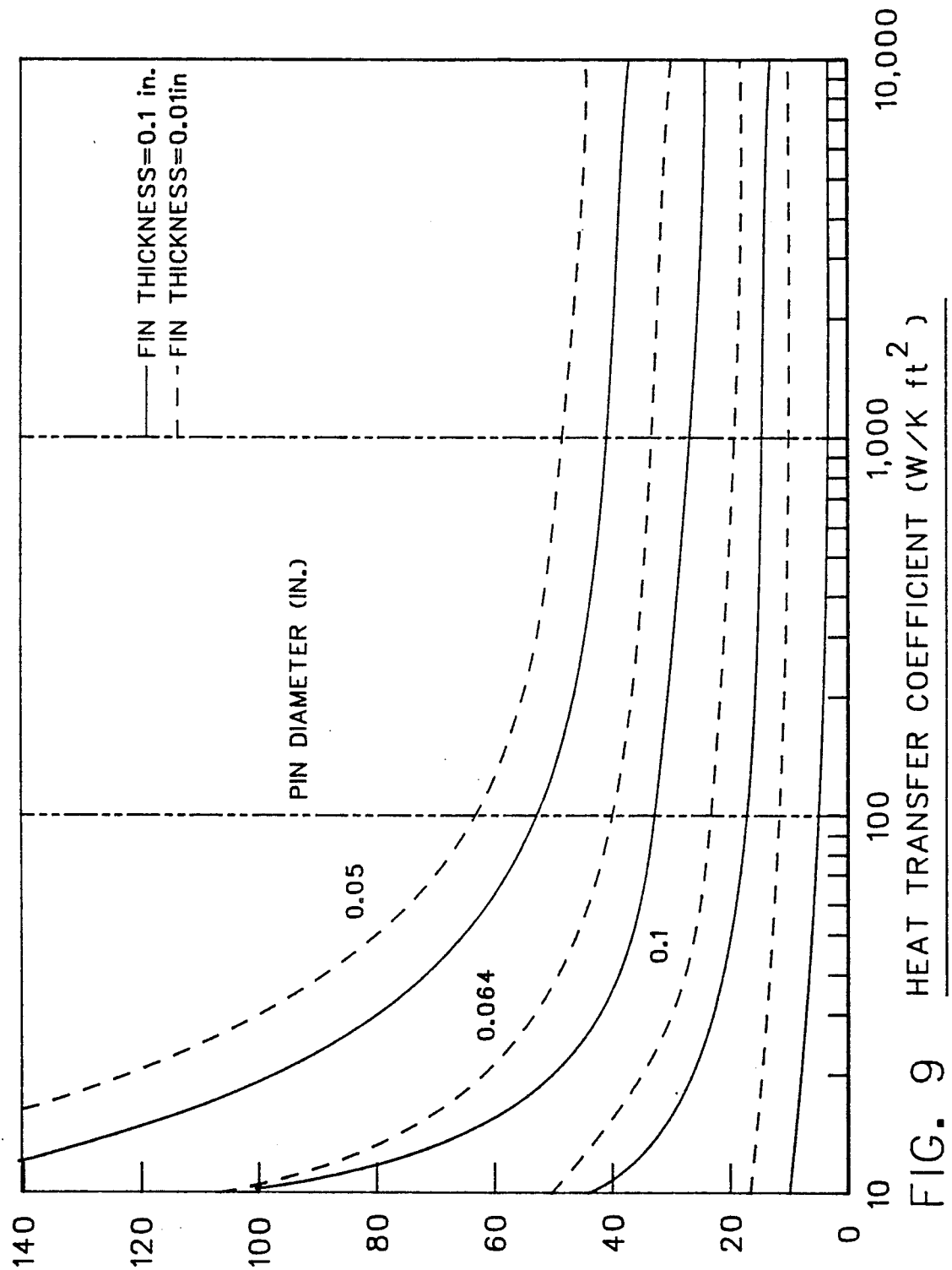

LOW TORQUE HINGED HEAT TRANSFER JOINT

BACKGROUND OF THE INVENTION

This invention relates to the field of mechanical hinges or ratary couplings and more particularly to the field of mechanical hinges suitable for use in aerospace, military and industrial applications requiring high thermal conductance, good reliability, low torque, small size, light weight, and a very low thermal gradient across a hinged joint operating in a deep space, vaccum environment.

DESCRIPTION OF PRIOR ART

Hinged joints typically move heat from a reference member to a pivoted member through a hinge by conducting heat from or to a fixed or reference hinge surface to or from a hinged moving surface. The reference member hinge surface is typically an internal sleeve or cylindrical surface. The reference or fixed member hinge surface is typically an internal sleeve or cylinder surface e.g. a gimbal or trunion. The moving hinged surface is typically a pin or cylindrical surface that is received by the sleeve or cylindrical reference surface. Other forms of hinges use ball bearings. The thermal gradient for a given heat load across the joint is a function of the available surface areas, the thermal area contact force, the thermal conductivity of the materials, the temperature at which the joint operates and the atmospheric pressure that the joint is required to operate in. Low torque applications typically provide a moving interface between the rotating surfaces. As the interface pressure is decreased, to reduce the torque required to rotate the hinge, the thermal gradient across the joint is increased for a given heat load at a given atmospheric pressure.

SUMMARY OF INVENTION

This invention characterizes an improved hinge for reliably coupling heat from a reference or fixed member to a hinged member with a low rotational torque input requirement and a very low thermal gradient for a given heat load. The main embodiment employs diamond materials at the hinge interfaces to provide high thermal conductivity (i.e., greater than that for high purity copper) and low friction coefficients (i.e., on the order of teflon). The diamond materials may take the form of single crystal industrial diamonds, polycrystalline diamonds or micron layer diamond coatings. For the best performance, all of these configurations must be coupled with other hinge materials of high thermal conductivity (e.g., copper, aluminum, etc.).

Heat is coupled to the joint and removed from the joint by structural and support elements and by heat pipes where more efficient transfer of heat from one assembly to another is required.

BRIEF DESCRIPTION OF THE DRAWINGS

FIGS. 7 and 8 are sectional views taken on line 3—3 of FIG. 3.

FIG. 9 is a graphical depiction for a specific example showing the number of finger pairs required as a function of the heat transfer coefficient for a alternate values of disk diameter and fin thickness.

BRIEF DESCRIPTION OF THE PREFERRED EMBODIMENT

Figure 1:
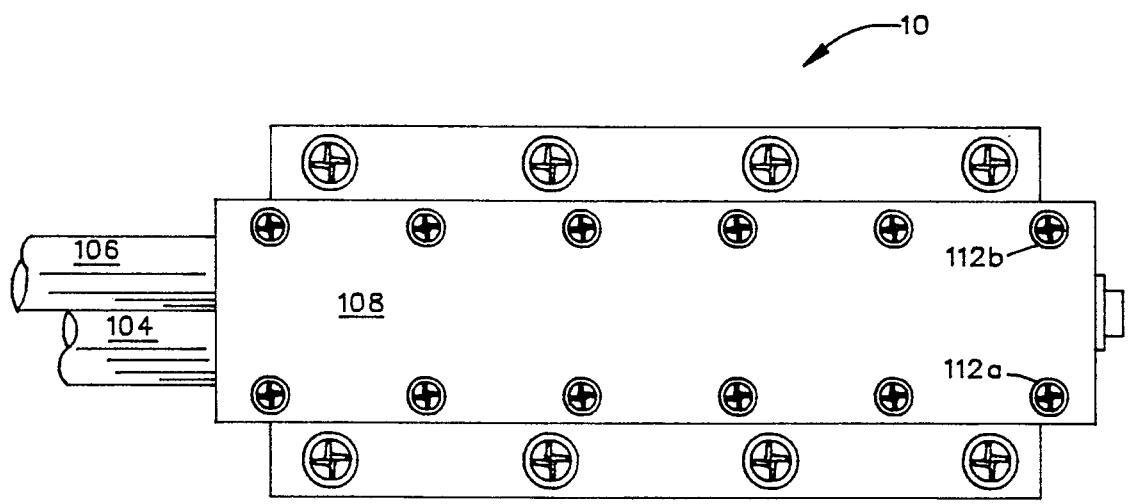
FIG. 1 is top plan view of the heat transfer hinge.
Figure 2:
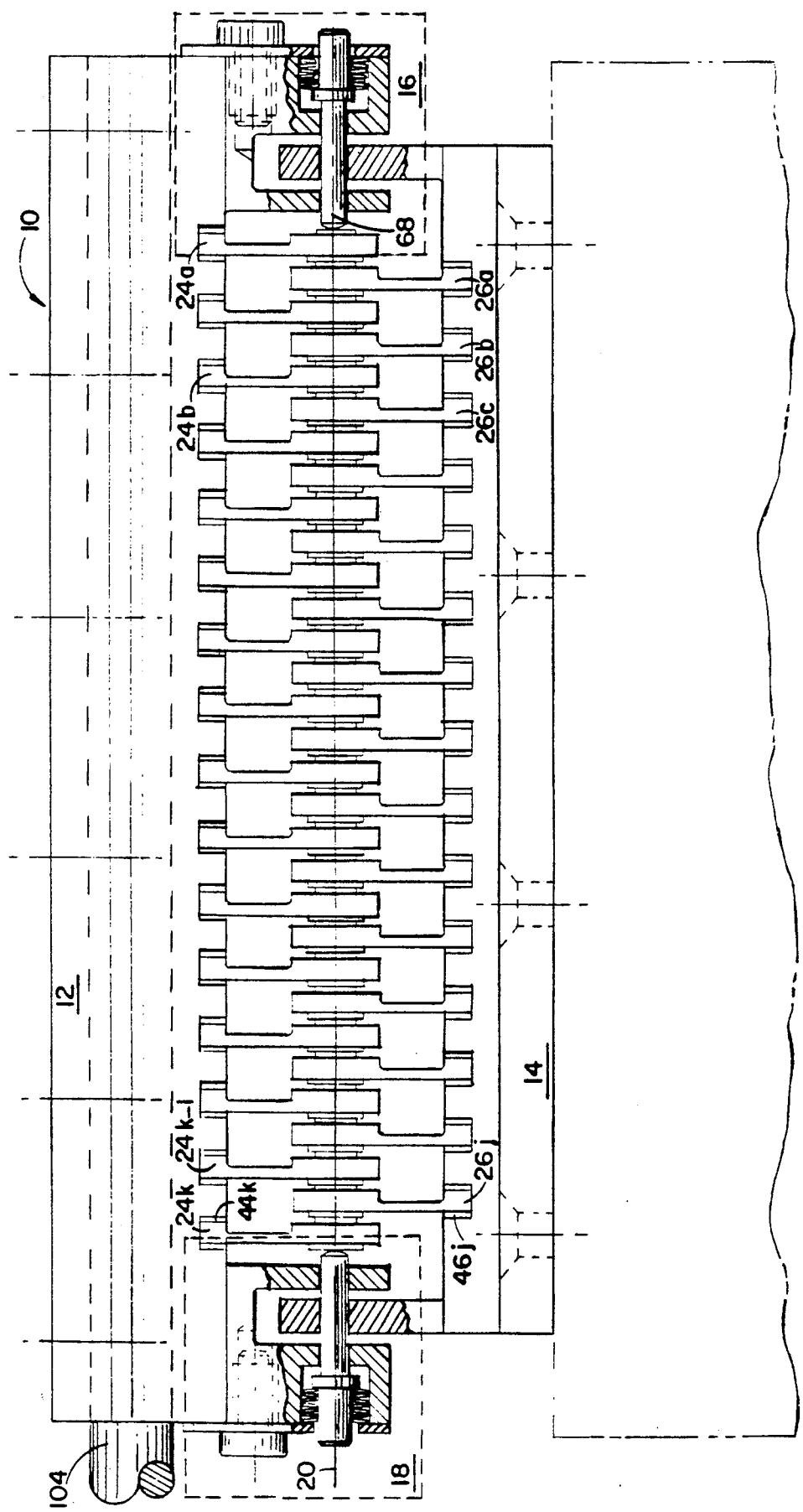
FIG. 2 is a side view of the heat transfer hinge of FIG. 1.

FIG. 1. is a top view and FIG. 2 is a side view of the invention heat transfer hinge 10 having a first rotor 12, and a second rotor 14. The configuration shown is for a polycrystalline diamond interface but would follow along the same lines for the single crystal or micron layer diamond interfaces. The assemblies within phantom blocks 16 and 18, shown in FIG. 2, represent a pivot means for pivotally coupling the first rotor to the second rotor. Each rotor is free to pivot on a pivot axis 20 passing between the first and second rotor, 12, 14. An arrangement of interleaved finger members, such as first rotor fingers 24$a$, 24$b$, . . . , 24$k$ and second rotor fingers 26$a$, 26$b$, . . . , 26$j$ located between phantom blocks 16 and 18, couples the first rotor to the second rotor via thermally conductive flat surfaces on adjacent rotor fingers.

Figure 6:
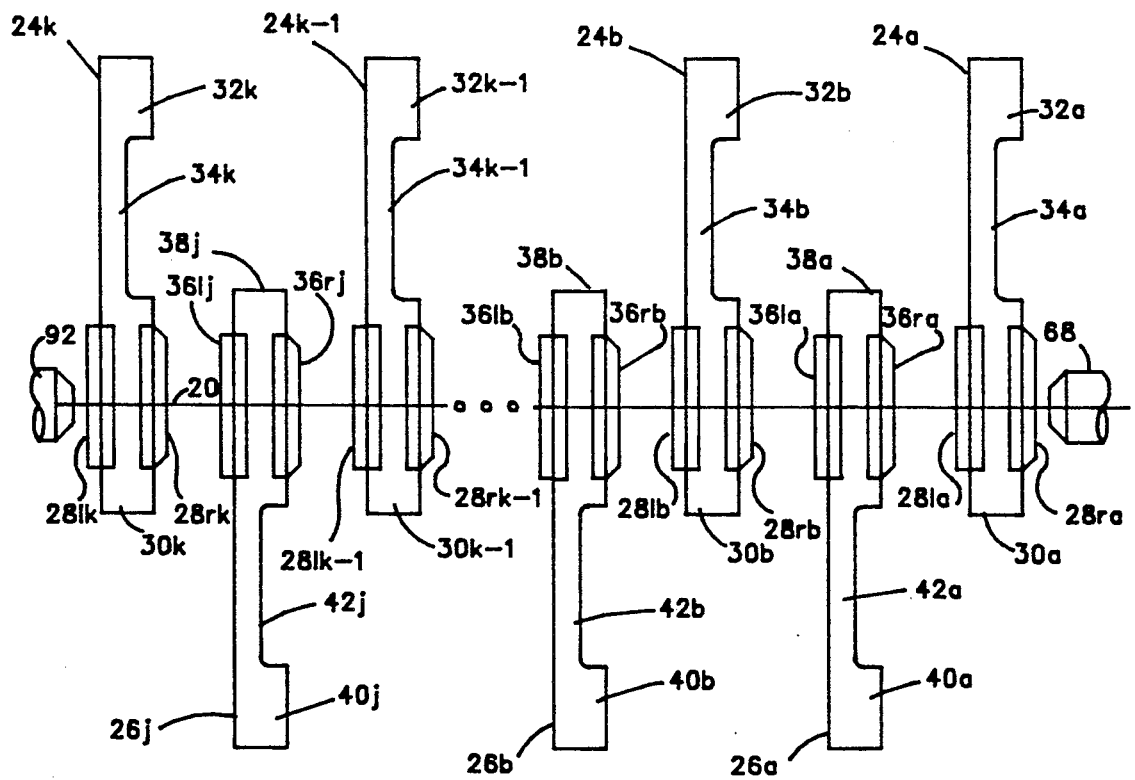
FIG. 6 is an exploded view of the finger members.

First rotor fingers 24$a$, 24$b$, . . . , 24$k$ represent a means for thermally coupling a thermally conductive flat surface to the first rotor. FIG. 6 is a schematic exploded view of the arrangement of interleaved fingers shown in FIG. 2.

FIG. 6 is an exploded partial schematic view of sections of FIG. 2, that shows that each first rotor finger has left and right thermally conductive flat surfaces 28$la$, 28$ra$, 28$lb$, 28$rb$, . . . , 28$lk$, 28$rk$ formed on parallel opposing sides of a respective first rotor finger head 30$a$, 30$b$, . . . , 30$k$. Each first rotor finger head is separated from a corresponding first rotor finger foot 32$a$, 32$b$, . . . , 32$k$ by a first rotor finger fin 34$a$, 34$b$, . . . , 34$k$.

FIG. 6 also shows that second rotor fingers 26$a$, 26$b$, . . . , 26$j$ represent a means for thermally coupling a thermally conductive flat surface to the second rotor. Each second rotor finger has left and right thermally conductive flat surface 36$la$, 36$ra$, 36$lb$, 36$rb$, . . . , 36$lj$, 36$rj$ formed on parallel opposing sides of a respective second rotor finger head 38$a$, 38$b$, . . . , 38$j$. Each second rotor finger head is separated from the respective second rotor finger foot 40$a$, 40$b$, . . . , 40$j$ by a second rotor finger fin 42$a$, 42$b$, . . . , 42$j$.

Figure 8:
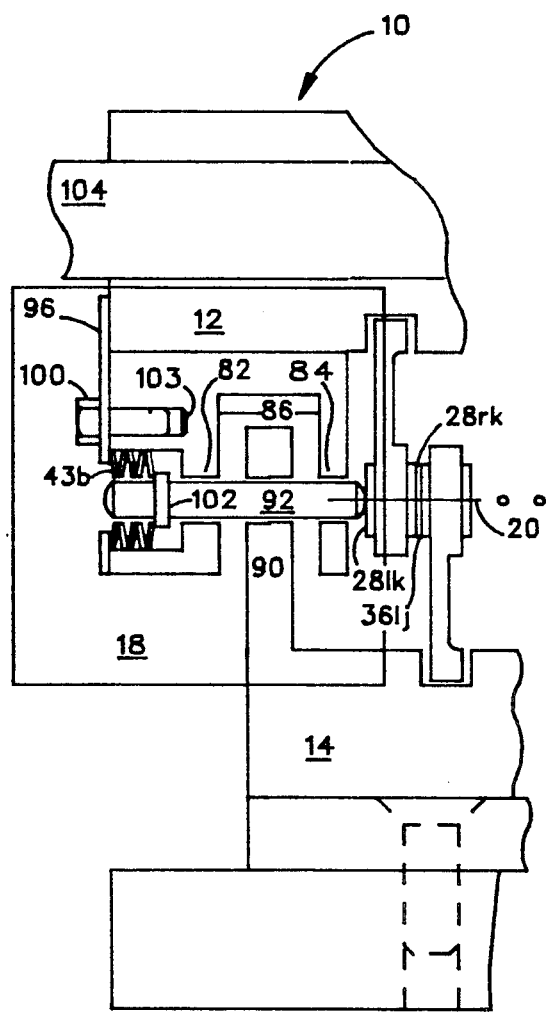
FIGS. 7 and 8 represent a partial side view showing the hinge arrangement.
Figure 7:
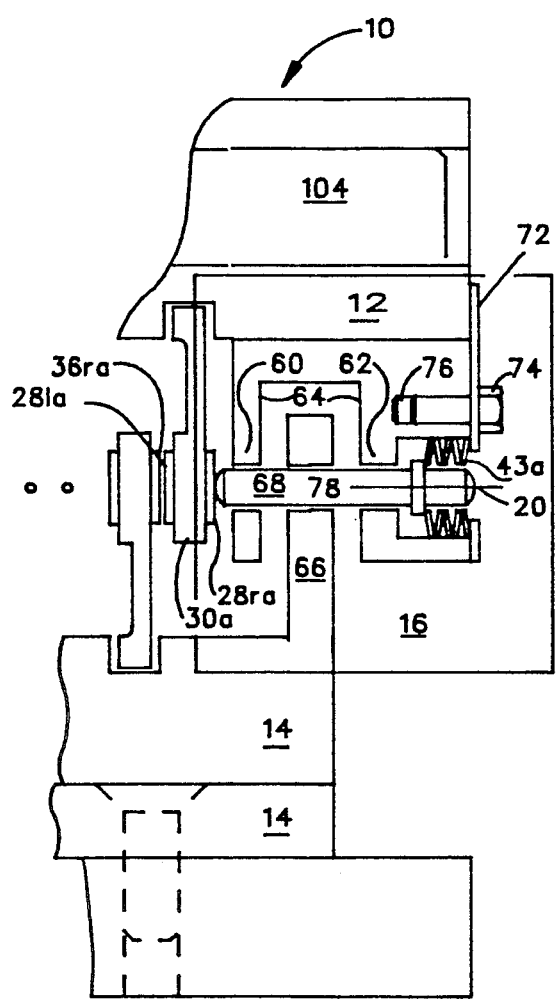

FIG. 2 and also FIGS. 7 and 8, show that the left and right thermally conductive flat surfaces on the first and second rotor fingers are positioned to be normal to the pivot axis by the pivot assemblies within phantom blocks 16 and 18. The pivot axis 20 passes centrally through each of the respective thermally conductive flat surfaces. Pivotal support is only provided by the pivot assemblies within phantom blocks 16 and 18. Right and left springs 43$a$, 43$b$ represent a means for holding the first rotor flat surface against the second rotor flat surface as the first rotor 12 is pivoted on the pivot axis 20 with respect to the second rotor 14.

The alignment of all fingers and the preloading of all first rotor thermally conductive faces against second rotor thermally conductive faces is achieved by jigging the respective first and second rotor fingers into the interleaved alignment apparent in FIG. 2 before they are rigidly fixed to the respective first and second rotors. The jig (not shown) is fashioned to position the thermally conductive surface on each first and second rotor finger to be normal to the pivot axis 20 prior to permanently affixing the finger members to the respective first and second rotors. The jig is also designed to allow the pivot axis to pass centrally, or as close to the center of the thermally conductive face of each of the respective thermally conductive flat surfaces as practical.

Referring again to FIGS. 6-8, each first rotor finger foot 32a, 32b . . . , 32k is coupled to the first rotor by positioning each first rotor finger foot in a corresponding first rotor foot aperture 44a, 44b . . . 44k. Each first rotor foot aperture is shaped to freely receive a corresponding first rotor finger foot without interference to avoid disturbing the jigged alignment of the first rotor fingers.

Each second rotor finger foot 40a, 40b . . . , 40k is coupled to the second rotor by positioning each second rotor finger foot in a corresponding second rotor foot aperture. Each second rotor foot aperture is shaped to freely receive a corresponding second rotor finger foot without interference to avoid disturbing the jigged alignment of the second rotor fingers.

The first and second rotor apertures shown in FIG. 2 are shaped as rectangular notches. The first rotor apertures 44a, 44b, . . . , 44k are formed in the lower edge of the first rotor 12. The second rotor apertures 46a, 46b, . . . 46j are in the upper edge of the second rotor 14.

Figure 4:
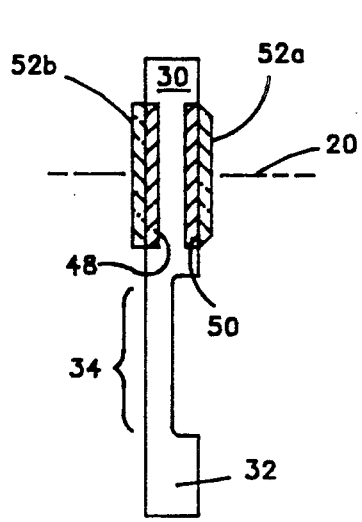
FIG. 4 is a side view of finger member.
Figure 5:
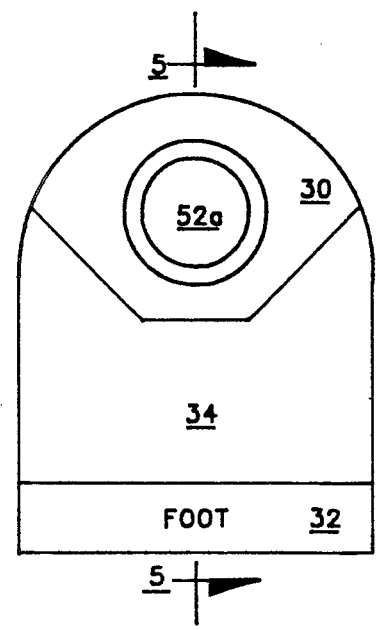
FIG. 5 is a front view of a finger member.

FIGS. 4 and 5 provide a detail side view and a detailed front view of a rotor finger. The finger is formed from a core of copper or aluminum. A left tungsten carbide disk 48 is received in a left mounting hole. A right tungsten carbide disk 50 is received in a right mounting hole. The left and right disks are attached by means of solder preforms positioned in the respective left and right mounting holes under the respective disks before raising the temperature of the jigged finger assembly to the melting point of the solder preform. In the preferred embodiment, the external surface of the disks are precoated with polycrystalline diamond material or with an alternative low friction material having good thermal conductivity. Single crystal diamond elements and micron layer diamond are believed to be suitable alternative coating elements.

FIGS. 4 and 5 also show that the thermally conductive faces, such as face 52a and 52b are typically circular in shape. The coating is applied to the tungsten carbide disks prior to affixing the disks to a finger member. Each disk has flat parallel surfaces. The polycrystalline surface of the inserts are flat to a tolerance of one tenthousandth of an inch and have a two micro inch finish. The right and left faces 52a, 52b, as shown in FIG. 4, are machined and polished to be parallel to within one thousandth of an inch.

The disks are coated with the polycrystalline diamond coating by companies such as Megadiamond, at 275 West 2230 North, Provo, Utah, 84604. Other sources for the diamond interface material include Sumitomo Electric USA Inc., at 23440 Hawthorne Blvd., Bldg. 2, Rm 210, Torrance, Calif., 90505-4762 for single crystal diamonds and the Beam Alloy Corp., 6360 Dublin Industrial Lane, Dublin, Ohio 43017 for micron layer diamond coatings. Some of the features of the processes used in making and polishing thermally conductive coatings for use in the preferred embodiment are described in the following U.S. patents:

1. U.S. Pat. No. 4,797,241; issued Jan. 10, 1989; for "Method for Producing Multiple Polycrystalline Bodies"; assigned to Megadiamond, at 275 West 2230 North, Provo, Utah, 84604.

2. U.S. Pat. No. 4,525,178; issued Jun. 25, 1985; for "Composite Polycrystalline Diamond"; assigned to Megadiamond Industries, Inc., North, Provo, Utah, 84604.

3. U.S. Pat. No. 3,913,280; issued Oct. 21, 1975; for "Polycrystalline Diamond Composites"; assigned to Megadiamond Corporation, Provo, Utah, 84604.

4. U.S. Pat. No. 4,662,348; issued May 5, 1987 1975; for "Burnishing Diamond"; assigned to Megadiamond Inc., Provo, Utah, 84604;

the contents of which are incorporated herein by reference.

The polycrystalline surface provides a hard wear resistant surface equal to that of diamond with compressive stress allowables of 500,000 psi. The surface is commonly formed by assembling fine diamond powder and tungsten carbide into a refractory mold. The assembly is then subjected to pressures that are near one million psi and heated by electric current to about 3000 degrees Fahrenheit. Upon cooling, the diamond crystals sinter together to form a solid mass with a tungsten carbide backing. The thermal conductivity of the polycrystalline coating is greater than that of pure copper and the coefficient of friction is less than that of Teflon (0.04). These properties combine to achieve the most efficient heat transfer possible between rotating surfaces. Heat transfer increases with increasing contact pressure across the joint or by increasing the area of the joint formed by the rotating thermally conductive faces while holding the contact pressure constant.

The tungsten carbide side of the disk is affixed to opposing sides of the head of each respective first and second rotor finger by soldering or brazing. In an embodiment in which the fingers are of copper, the disks are attached to the finger heads using indium solder. A solder preform is used between the back of each disk and the corresponding surface of the finger. The disks are held in contact with opposing sides of a finger by a finger assembly jig (not shown) to insure parallel surfaces as the jigged finger and disk arrangement is raised in temperature above the melting point of the solder. The opposing left and right polycrystalline diamond surfaces are controlled to be parallel to within one thousandth of an inch by specification to insure low torque operation when the fingers are interposed between adjacent fingers and also to insure good thermal contact with adjacent thermally conductive flat surfaces.

For aluminum soldering is performed at 550 to 770 degrees F. This temperature range allows the flux to dissolve the aluminum oxide which coats the aluminum suface. Alloys used in soldering aluminum generally contain 50-75 percent tin with the remainder zinc. Fluxless soldering can be used for copper, aluminum and silver. One method of fluxless soldering consists of an ultrasonic generator and soldering head with a transducer coupling for the solder tip and heater. Brazing which takes place at temperatures above 800 degrees F. can be used with both copper and aluminum and their alloys.

FIGS. 7 and 8 provide expanded views of the pivot means 16, 18 or hinges on which the first and second rotors 12, 14 rotate in greater detail. The right pivot means within phantom box 16 is depicted in FIG. 7 as a yoke having a left tang 60 and a right tang 62 coupled to the first rotor 12 to form a slot 64. A center tang 66 is coupled to the second rotor 14 for insertion into the slot 64. A right pin 68 is supported by the left and right tang 60, 62 in coaxial alignment with the pivot axis 20. The right pin 68 passes through the center tang 66 to provide a bearing surface on which to pivot the second rotor 14. The second rotor 14 is pivotally supported by the right pin 68.

Belville spring washers 43a represent a right spring means for providing a constant preload force to the pin with respect to the first rotor 12. The pin extends freely through the yoke and applies a preload force to thermally conductive flat surface 28ra to hold a first rotor flat surface, such as flat surface 28la against a second rotor flat surface, such as surface 36ra.

Retaining plate 72 is coupled to the first rotor 12 by screw 74 as it passes through retaining plate 72 into a threaded receiving hole 76. The retaining plate is normal to the pivot axis 20. The pin has a collar 78 to support the right spring washers 43a as the partially compressed right springs 43a apply a force to the left against the collar with respect to the retaining plate 72. The springs are coaxially positioned on the pin 68.

The left pivot means within phantom box 18 is depicted in FIG. 8 as a yoke having a left tang 82 and a right tang 84 coupled to the first rotor 12 to form a slot 86. A center tang 90 is coupled to the second rotor 14 for insertion into the slot 86. A left pin 92 is suported by the left and right tang 82, 84 in coaxial alignment with the pivot axis 20. The left pin 92 passes through the center tang 90 to provide a bearing surface on which to pivot the second rotor 14. The second rotor 14 is pivotally supported by the left pin 92.

Belville spring washers 43b represent a left spring means for providing a constant preload force to the pin with respect to the first rotor 12. The pin extends freely through the left yoke and applies a preload force to thermally conductive flat surface 28lk to hold a first rotor flat surface, such as flat surface 28rk against a second rotor flat surface, such as surface 36lj.

Left retaining plate 96 is coupled to the first rotor 12 by screw 100 as it passes through retaining plate 96 into a left threaded receiving hole 103. The retaining plate is normal to the pivot axis 20. The pin has a collar 102 to support the spring washers 43b as the partially compressed springs 43b apply a force to the right against the collar 102 with respect to the retaining plate 96. The springs are coaxially positioned on the pin 92.

Figure 3:
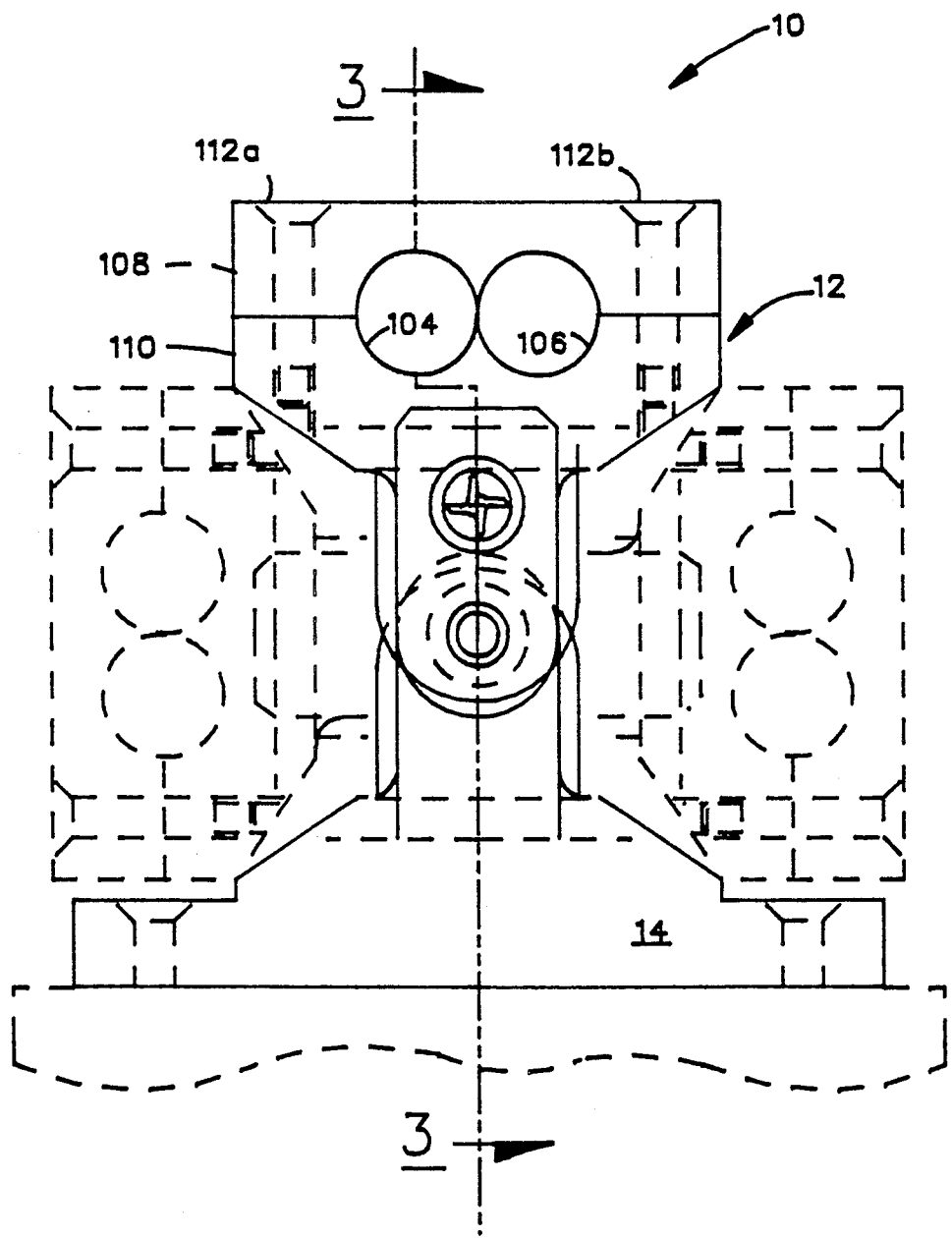
FIG. 3 is an end elevation view of the heat transfer hinge showing alternate rotational limit positions.

First rotor heat pipes 104, 106 are shown embedded in first rotor 12 in FIGS. 2, 3, 7 and 8. FIG. 3 shows a top carrier 108 and bottom carrier 110, respectively forming top and bottom sections of the first rotor 12. The heat pipes 104, 106 are positioned side by side within precision channels. The top and bottom sections are coupled by screws 112a, 112b. These screws hold the sections in contact with each other and in contact with the heat pipes 104 and 106. FIG. 1 shows the top section 108. Heat pipes of this type are available from companies such as Hughes Aircraft, El Segundo, Calif. and Grumman Aerospace Corp. of Bethpage, Long Island, N.Y. The heat pipes move heat quickly from one location to another with a very low temperature difference along the length of the device.

Referring to FIGS. 6-8, finger member 24a represents a first finger member coupled to the first rotor and finger member 24k represents a last finger member coupled to the first rotor. The last finger member extends from the first rotor. The last finger member has a flat surface 28rk positioned on the last finger member normal to the pivot axis and supported against a corresponding second rotor finger member flat surface 36lj. Pin 92 represents a left pressure means for providing a predetermined force referenced to the first rotor 12. The predetermined force is coaxially aligned with the pivot axis 20 to drive the last finger member flat surface to the right against the corresponding second finger member flat surface. Pin 68 represents a right pressure means for providing a predetermined force referenced to the first rotor 12. The predetermined force is coaxially aligned with the pivot axis 20 to drive the last finger member flat surface to the left against the corresponding second finger member flat surface.

FIG. 9 graphically portrays the performance of the embodiment shown in FIGS. 1-8 for a heat transport requirement of 7 watts, from the first rotor to the second rotor with a temperature difference of 3 degrees Kelvin across the assembly. The functional relationship between the dependent variable "NO. HINGED PAIRS (n)" as a function of the independent variable "HEAT TRANSFER COEFFICIENT (W/K ft$^2$)" is graphed as pairs of curves for alternate values of fin thickness of 0.1 inch and 0.01 inches. Pairs of curves are depicted for predetermined pin diameters of 0.05, 0.064, 0.1 and 0.30 inches. The curves of FIG. 9 show that the number of hinged pairs that are required is relatively insensitive to the heat transfer coefficient, the independent variable, until values below 100 w/KA$^2$ are reached. Values above this are easily obtained with interface pressure loads as low as 50 pounds by test. For pin diameters above 0.1 inches, the number of hinged pairs is above 20 allowing a design that is lighweight and easy to assemble.

The description provided is intended to be illustrative only and is not intended to be limitative. Those skilled in the art may conceive of modifications to the figure disclosed. However, any such modifications which fall within the purview of the description are intended to be included therein as well. The scope of this invention shall be determined from the scope of the following claims including their equivalents.

I claim:

1. A heat transfer hinge comprising:
   a first rotor;
   a second rotor;
   pivot means for pivotally coupling the first rotor to the second rotor, each rotor being free to pivot on a pivot axis passing between the first and second rotor;
   means for thermally coupling a thermally conductive flat surface to the first rotor, the flat surface being positioned to be normal to the pivot axis; and
   means for thermally coupling a thermally conductive flat surface to the second rotor, the flat surface being positioned to be normal to the pivot axis;
   means for holding the first rotor flat surface against the second rotor flat surface as the first rotor is pivoted on the pivot axis with respect to the second rotor;
   wherein said pivot means comprises:
   a yoke having a left tang and a right tang coupled to the first rotor to form a slot;
   a center tang coupled to the second rotor for insertion into the slot; and
   a pin supported by the left and right tang in coaxial alignment with the pivot axis, the pin passing through the center tang, the second rotor being pivotally supported by the pin; and a spring for providing a constant preload force to the pin with respect to the first rotor, the pin extending freely through the yoke and applying the preload force to hold the first rotor flat surface against the second rotor flat surface; and wherein the spring means further comprises:
a retaining plate coupled to the first rotor, the retaining plate being normal to the pivot axis;
the pin further comprising a collar;
the spring being coaxially positioned on the pin and compressed to apply a force between the retaining plate and the pin collar, the pin being driven to hold the first rotor flat surface against the second rotor flat surface.

2. A heat transfer hinge comprising:
a first rotor;
a second rotor;
pivot means for pivotally coupling the first rotor to the second rotor, each rotor being free to pivot on a pivot axis passing between the first and second rotor;
means for thermally coupling a thermally conductive flat surface to the first rotor, the flat surface being positioned normal to the pivot axis;
means for thermally coupling a thermally conductive flat surface to the second rotor, the flat surface being positioned normal to the pivot axis;
means for holding the first rotor flat surface against the second rotor flat surface as the first rotor is pivoted on the pivot axis with respect to the second rotor;
at least a first finger member coupled to the first rotor, the first finger member extending from the first rotor, the first rotor flat surface being positioned on the first finger member normal to the pivot axis;
at least a second finger member coupled to the second rotor, the second finger member extending from the second rotor, the second rotor flat surface being positioned on the second finger member normal to the pivot axis; and
the first rotor flat surface being positioned against the second rotor flat surface;
a right pressure means for providing a predetermined force referenced to the first rotor, the force being coaxially aligned with the pivot axis to drive the first finger member against the second finger member, the first finger member flat surface being positioned on the first finger member normal to the pivot axis and supported against a corresponding second rotor finger member flat surface;
a last finger member coupled to the first rotor, the last finger member extending from the first rotor, the last finger member having a flat surface positioned on the last finger member normal to the pivot axis and supported against a corresponding second rotor finger member flat surface; and
a left pressure means for providing a predetermined force referenced to the first rotor, the predetermined force being coaxially aligned with the pivot axis to drive the last finger member flat surface against the corresponding second finger member flat surface.

3. A non-load bearing hinged heat transfer mechanism for conducting heat across a pivoting interface having a pivot axis, comprising:
a first rotor having a length substantially parallel to said pivot axis;
a plurality of first rotor fingers, each having a finger foot coupled to said first rotor, and having a finger head, wherein said first rotor fingers are coupled to said first rotor periodically along the length of said first rotor, and each of said first rotor finger heads has a pair of substantially solid thermally conductive surfaces;
a second rotor having a length substantially parallel to said pivot axis; and
a plurality of second rotor fingers, each having a finger foot coupled to said second rotor, and having a finger head, wherein said second rotor fingers are coupled to said second rotor periodically along a length of said second rotor, and each of said second rotor finger heads has a pair of substantially solid thermally conductive surfaces;
wherein the heads of said first rotor fingers and the heads of said second rotor fingers are interleaved so that said thermally conductive surfaces of said finger heads abut one another to thereby define a substantially circular contact areas each having a given diameter, wherein said diameters are substantially greater than the thicknesses of said finger heads, including said thermally conductive surfaces, measured in the direction of said pivot axis.

4. The hinged heat transfer mechanism of claim 3, wherein said thermally conductive surfaces are substantially flat.

5. The hinged heat transfer mechanism of claim 4, wherein said thermally conductive surfaces are substantially perpendicular to said pivot axis.

6. The hinged heat transfer mechanism of claim 5, wherein said thermally conductive surfaces are solid and unperforated.

7. The hinged heat transfer mechanism of claim 6, wherein said thermally conductive surfaces each finger comprise a layer of tungsten carbide and a layer of polycrystalline diamond.

8. The hinged heat transfer mechanism of claim 7, additionally comprising a spring axially aligned with said pivot axis for exerting a predetermined force against one of said rotors for holding said thermally conductive surfaces in contact with one another.

9. A non-load bearing hinged heat transfer mechanism for conducting heat across a pivoting interface having a pivot axis, comprising:
a first rotor having a length substantially parallel to said pivot axis;
a plurality of first rotor fingers, each having a finger foot coupled to said first rotor, and having a finger head, wherein said first rotor fingers are coupled to said first rotor periodically along the length of said first rotor, and each of said first rotor finger heads has a pair of thermally conductive surfaces intersecting said pivot axis;
a second rotor having a length substantially parallel to said pivot axis; and
a plurality of second rotor fingers, each having a finger foot coupled to said second rotor, and having a finger head, wherein said second rotor fingers are coupled to said second rotor periodically along a length of said second rotor, and each of said second rotor finger heads has a pair of thermally conductive surfaces intersecting said pivot axis;
wherein the heads of said first rotor fingers and the heads of said second rotor fingers are interleaved so that said thermally conductive surfaces of said finger heads abut one another to thereby define a substantially circular contact areas each having a given diameter, wherein said diameters are substantially greater than the thicknesses of said finger heads, including said thermally conductive surfaces, measured in the direction of said pivot axis.

10. The hinged heat transfer mechanism of claim 9, wherein said thermally conductive surfaces are solid and unperforated.

11. The hinged heat transfer mechanism of claim 10, wherein said thermally conductive surfaces are substantially perpendicular to said pivot axis.

12. The hinged heat transfer mechanism of claim 11, wherein said thermally conductive surfaces are substantially flat.

13. The hinged heat transfer mechanism of claim 12, wherein said thermally conductive surfaces each finger comprise a layer of tungsten carbide and a layer of polycrystalline diamond.

14. The hinged heat transfer mechanism of claim 13, additionally comprising a spring axially aligned with said pivot axis for exerting a predetermined force against one of said rotors for holding said thermally conductive surfaces in contact with one another.

* * * * *